(12) United States Patent
Wada et al.

(10) Patent No.: US 9,467,592 B2
(45) Date of Patent: Oct. 11, 2016

(54) FACSIMILE MACHINE, NON-TRANSITORY COMPUTER READABLE MEDIUM, AND FACSIMILE COMMUNICATION METHOD FOR SORTING IMAGE DATA RECEIVED INTO STORAGE DESTINATIONS

(71) Applicant: FUJI XEROX CO., LTD., Minato-ku, Tokyo (JP)

(72) Inventors: Manabu Wada, Kanagawa (JP); Hirotaka Kawabata, Kanagawa (JP); Satoshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/299,273

(22) Filed: Jun. 9, 2014

(65) Prior Publication Data

US 2015/0043040 A1 Feb. 12, 2015

(30) Foreign Application Priority Data

Aug. 9, 2013 (JP) .................................. 2013-167113

(51) Int. Cl.
*H04N 1/00* (2006.01)
*H04N 1/32* (2006.01)
*H04N 1/333* (2006.01)

(52) U.S. Cl.
CPC ...... *H04N 1/32379* (2013.01); *H04N 1/00095* (2013.01); *H04N 1/32443* (2013.01); *H04N 1/00206* (2013.01); *H04N 1/00209* (2013.01); *H04N 1/33369* (2013.01); *H04N 2201/0093* (2013.01); *H04N 2201/3205* (2013.01); *H04N 2201/3278* (2013.01); *H04N 2201/3285* (2013.01); *H04N 2201/3287* (2013.01)

(58) Field of Classification Search
None
See application file for complete search history.

(56) References Cited

U.S. PATENT DOCUMENTS

| | | | | |
|---|---|---|---|---|
| 5,127,047 | A * | 6/1992 | Bell et al. | 379/100.06 |
| 6,137,597 | A * | 10/2000 | Kanaya | 358/402 |
| 2003/0095289 | A1* | 5/2003 | Mitani | 358/402 |
| 2005/0110616 | A1* | 5/2005 | Kajiwara | 340/286.01 |
| 2006/0126101 | A1* | 6/2006 | Shutt et al. | 358/1.15 |
| 2009/0257075 | A1* | 10/2009 | Izumisawa | H04N 1/324 358/1.13 |

FOREIGN PATENT DOCUMENTS

JP    2000-101776 A    4/2000

* cited by examiner

Primary Examiner — Miya J Cato
(74) Attorney, Agent, or Firm — Sughrue Mion, PLLC (57) ABSTRACT

A facsimile machine includes an image data receiving unit, a transmitting subscriber identification receiving unit, and a sorting unit. The image data receiving unit receives image data transmitted from a transmitting facsimile machine. The transmitting subscriber identification receiving unit receives transmitting subscriber identification specified as an arbitrary signal in a Group 3 standard and transmitted from the transmitting facsimile machine. The sorting unit sorts the image data received by the image data receiving unit into at least one of plural storage destinations on the basis of the transmitting subscriber identification received by the transmitting subscriber identification receiving unit and one or more predetermined sorting conditions.

3 Claims, 11 Drawing Sheets

| BOX | SORTING CONDITION |
|-----|-------------------|
| A   | 1112222           |
| B   | 042*              |
| C   | 6667777           |
| D   | 8889999           |

|  | TRANSMITTING SUBSCRIBER IDENTIFICATION (TSI) | NUMERICAL STRING | REFERENCE NUMERICAL STRING | DETERMINATION RESULT |
|---|---|---|---|---|
| [1] | +81451112222 | 81451112222 | 1112222 | POSITIVE CORRESPONDENCE |
| [2] | +81 45-111-2222 | 81451112222 | 1112222 | POSITIVE CORRESPONDENCE |
| [3] | 0451112222 | 0451112222 | 1112222 | POSITIVE CORRESPONDENCE |
| [4] | 045-111-2222 | 0451112222 | 1112222 | POSITIVE CORRESPONDENCE |
| [5] | 045 111 2222 | 0451112222 | 1112222 | POSITIVE CORRESPONDENCE |

FIG. 10

|  | TRANSMITTING SUBSCRIBER IDENTIFICATION (TSI) | NUMERICAL STRING | REFERENCE NUMERICAL STRING | DETERMINATION RESULT |
|---|---|---|---|---|
| [1] | 0422223333 | 0422223333 | 042* | POSITIVE CORRESPONDENCE |
| [2] | 042-222-3333 | 0422223333 | 042* | POSITIVE CORRESPONDENCE |
| [3] | 042 222 3333 | 0422223333 | 042* | POSITIVE CORRESPONDENCE |

|  | ORDER OF PRIORITY |
|---|---|
| TRANSMITTING FACSIMILE NUMBER | 2 |
| RECEIVING FACSIMILE NUMBER | 3 |
| TRANSMITTING SUBSCRIBER IDENTIFICATION (TSI) | 1 |

FIG. 13

| BOX | SORTING CONDITION |
|---|---|
| A | 0451112222 |
| B | 042* |
| C | 0436667777 |
| D | 0438889999 |

FIG. 14

| BOX | SORTING CONDITION |
|---|---|
| A | 0399990001 |
| B | 0399990002 |
| C | 0399990003 |
| D | 0399990004 |

FACSIMILE MACHINE, NON-TRANSITORY COMPUTER READABLE MEDIUM, AND FACSIMILE COMMUNICATION METHOD FOR SORTING IMAGE DATA RECEIVED INTO STORAGE DESTINATIONS

CROSS-REFERENCE TO RELATED APPLICATIONS

This application is based on and claims priority under 35 USC 119 from Japanese Patent Application No. 2013-167113 filed Aug. 9, 2013.

BACKGROUND

Technical Field

The present invention relates to a facsimile machine, a non-transitory computer readable medium, and a facsimile communication method.

SUMMARY

According to an aspect of the invention, there is provided a facsimile machine including an image data receiving unit, a transmitting subscriber identification receiving unit, and a sorting unit. The image data receiving unit receives image data transmitted from a transmitting facsimile machine. The transmitting subscriber identification receiving unit receives transmitting subscriber identification specified as an arbitrary signal in a Group 3 standard and transmitted from the transmitting facsimile machine. The sorting unit sorts the image data received by the image data receiving unit into at least one of plural storage destinations on the basis of the transmitting subscriber identification received by the transmitting subscriber identification receiving unit and one or more predetermined sorting conditions.

BRIEF DESCRIPTION OF THE DRAWINGS

An exemplary embodiment of the present invention will be described in detail based on the following figures, wherein.

DETAILED DESCRIPTION

An example of an exemplary embodiment of the present invention will be described in detail below on the basis of the drawings.

Figure 1:
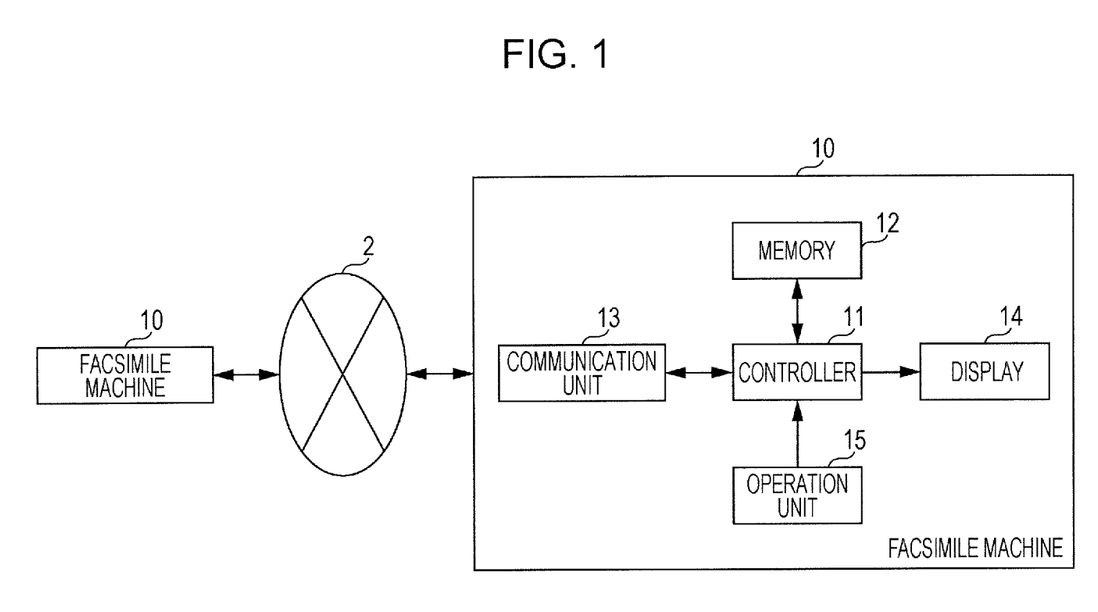
FIG. 1 is a diagram illustrating an example of a hardware configuration of a facsimile machine according to an exemplary embodiment of the present invention.

FIG. 1 illustrates an example of a hardware configuration of a facsimile machine according to an exemplary embodiment of the present invention. A facsimile machine 10 according to the present exemplary embodiment is connected to a network 2, such as a public telephone network, and performs facsimile communication with another facsimile machine 10. The facsimile machine 10 performs facsimile communication in conformity to the international standard for facsimile communication standardized by the International Telecommunication Union Telecommunication Standardization sector (ITU-TS). The following description will be given on the assumption that the facsimile machine 10 performs facsimile communication in conformity to the Group 3 (G3) standard.

As illustrated in FIG. 1, the facsimile machine 10 includes a controller 11, a memory 12, a communication unit 13, a display 14, and an operation unit 15. The controller 11 includes one or plural microprocessors, for example, and executes processing in accordance with a program stored in the memory 12. The memory 12 includes a major memory (a random access memory (RAM), for example) and an auxiliary memory (a read only memory (ROM) and a hard disk, for example).

The communication unit 13 is for performing facsimile communication via the network 2. The display 14, which is a liquid crystal display panel or an organic electroluminescence (EL) display, for example, displays a screen in accordance with an instruction from the controller 11.

The operation unit 15 is operated by a user. If the facsimile machine 10 includes one or plural operation members, the one or plural operation members correspond to the operation unit 15. For example, if the facsimile machine 10 includes one or plural keys, the one or plural keys correspond to the operation unit 15. Further, for example, if the facsimile machine 10 includes a touch panel superimposed on the display 14, the touch panel corresponds to the operation unit 15.

Figure 2:
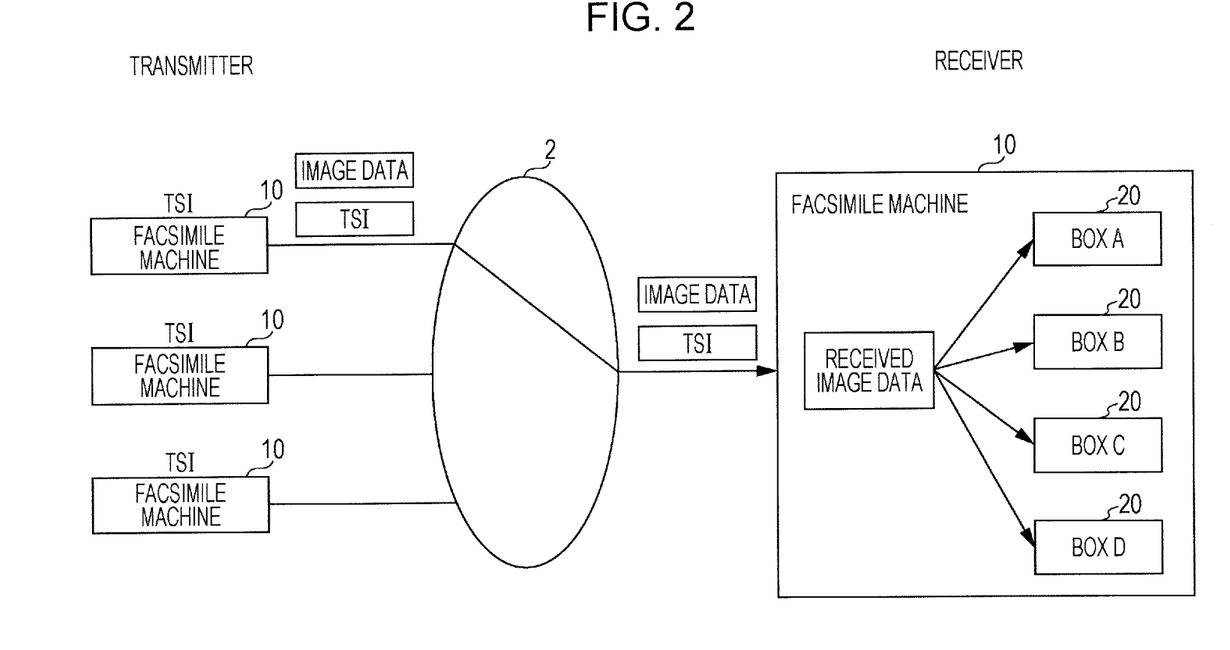
FIG. 2 is a diagram for illustrating a function of sorting received image data.

The facsimile machine 10 has a function of sorting image data received from another facsimile machine 10 into one of plural boxes. FIG. 2 is a diagram for illustrating the function of sorting the received image data.

As illustrated in FIG. 2, plural boxes 20 for storing the received image data are previously set in the facsimile machine 10. In the example illustrated in FIG. 2, four boxes 20 are set. The number of the boxes 20 is not limited to four.

For example, each of the boxes 20 is set with a password to limit users allowed to access the received image data stored in the box 20. Setting the password for the box 20 is not necessary, and the users allowed to access the received image data stored in the box 20 may not be limited.

Herein, an object as the storage destination (sorting destination) of the received image data is designated as "box." The object as the storage destination of the received image data, however, may be referred to by a name other than "box." For example, the object as the storage destination of the received image data may be referred to as "folder" or "directory."

The facsimile machine 10 executes sorting of the received image data on the basis of transmitting subscriber identification (TSI) specified in the G3 standard. The G3 standard specifies the transmitting subscriber identification (TSI) as an arbitrary signal to allow a transmitting facsimile machine to transmit the transmitting subscriber identification (TSI) thereof to a receiving facsimile machine in facsimile communication.

Identification information transmitted as the transmitting subscriber identification (TSI) in facsimile transmission is previously registered in the facsimile machine 10 by the user. For example, if the user performs a predetermined operation on the facsimile machine 10, an identification information registration screen for registering the above-described identification information is displayed on the display 14.

Figure 3:
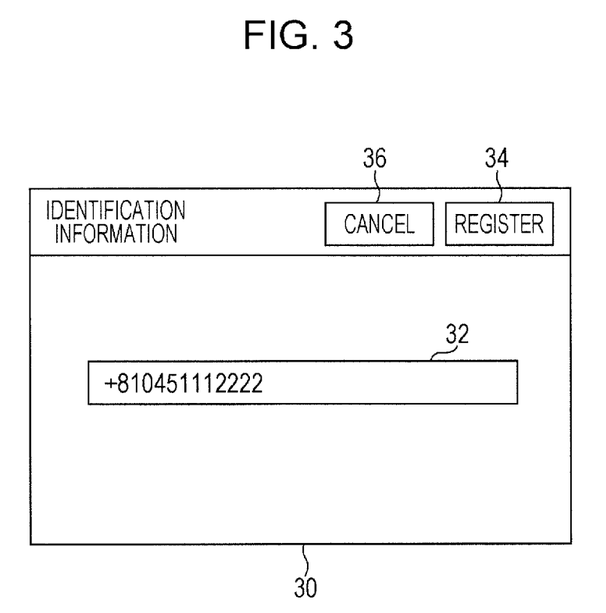
FIG. 3 is a diagram illustrating an example of an identification information registration screen.

FIG. 3 illustrates an example of the identification information registration screen. As illustrated in FIG. 3, an identification information registration screen 30 includes an input field 32 for inputting the above-described identification information. The user inputs the above-described identification information in the input field 32, and presses a register button 34. If the user presses the register button 34, the identification information input in the input field 32 is stored in the memory 12. If the user wants to cancel the registration, the user presses a cancel button 36.

As illustrated in FIG. 2, when one facsimile machine 10 (a transmitting facsimile machine 10) transmits image data to another facsimile machine 10 (a receiving facsimile machine 10), the above-described identification information stored in the memory 12 of the transmitting facsimile machine 10 is transmitted to the receiving facsimile machine 10 as the transmitting subscriber identification (TSI).

Then, the receiving facsimile machine 10 executes the sorting of the received image data by using the transmitting subscriber identification (TSI) received from the transmitting facsimile machine 10. That is, one of the boxes 20 according to the transmitting subscriber identification (TSI) is determined as the storage destination of the received image data, and the received image data is stored in the box 20. The received image data is thus sorted in accordance with the transmission source.

Figure 4:
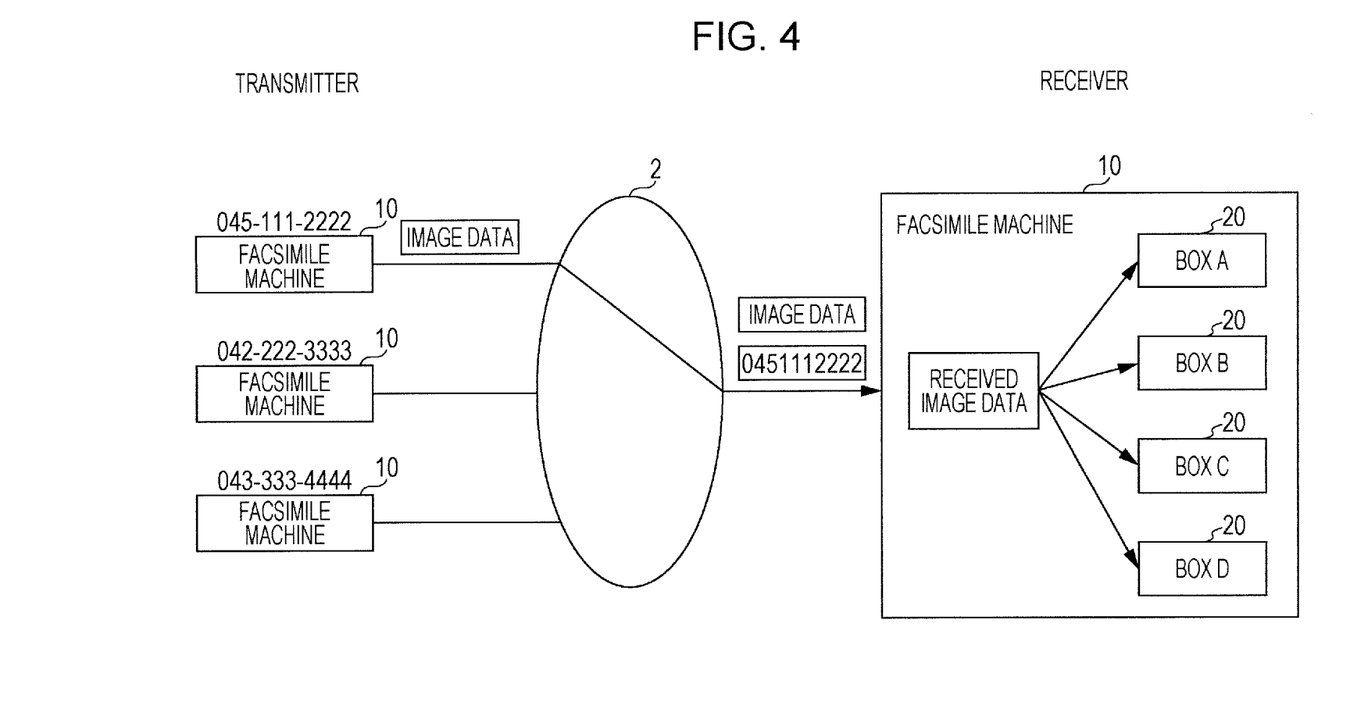
FIG. 4 is a diagram for illustrating another example of a method of sorting the received image data.

As another method of sorting the received image data in accordance with the transmission source, a method using a caller number notification service provided by a communication service provider is conceivable. FIG. 4 is a diagram for illustrating the method.

According to the above-described method, the user of the receiving facsimile machine 10 subscribes the caller number notification service. If the user of the receiving facsimile machine 10 subscribes the caller number notification service, the receiving facsimile machine 10 is notified of the facsimile number (telephone number) of the transmitting facsimile machine 10. In this case, the receiving facsimile machine 10 determines the storage destination of the received image data on the basis of the facsimile number of the transmitting facsimile machine 10 notified by the caller number notification service. That is, one of the boxes 20 according to the facsimile number of the transmitting facsimile machine 10 is determined as the storage destination of the received image data, and the received image data is stored in the box 20. It is possible to sort the received image data in this manner in accordance with the transmission source.

The specifications of the caller number notification service, however, may vary depending on the country (the communication service provider). To realize the sorting function in each country, therefore, it is necessary to realize the sorting function in accordance with the specifications of the caller number notification service in the country. As a result, costs for realizing the sorting function are increased. Further, to use the caller number notification service, the user of the receiving facsimile machine 10 needs to subscribe the caller number notification service.

In this regard, the facsimile machine 10 according to the present exemplary embodiment is capable of sorting the received image data in accordance with the transmission source by using the transmitting subscriber identification (TSI) specified in the international standard (G3 standard) for facsimile communication. That is, the sorting function according to the transmission source is realized without consideration of differences in specifications between countries (or communication service providers). Further, in the facsimile machine 10 according to the present exemplary embodiment, the sorting function according to the transmission source is realized without subscription to the caller number notification service by the user of the receiving facsimile machine 10.

Figure 5:
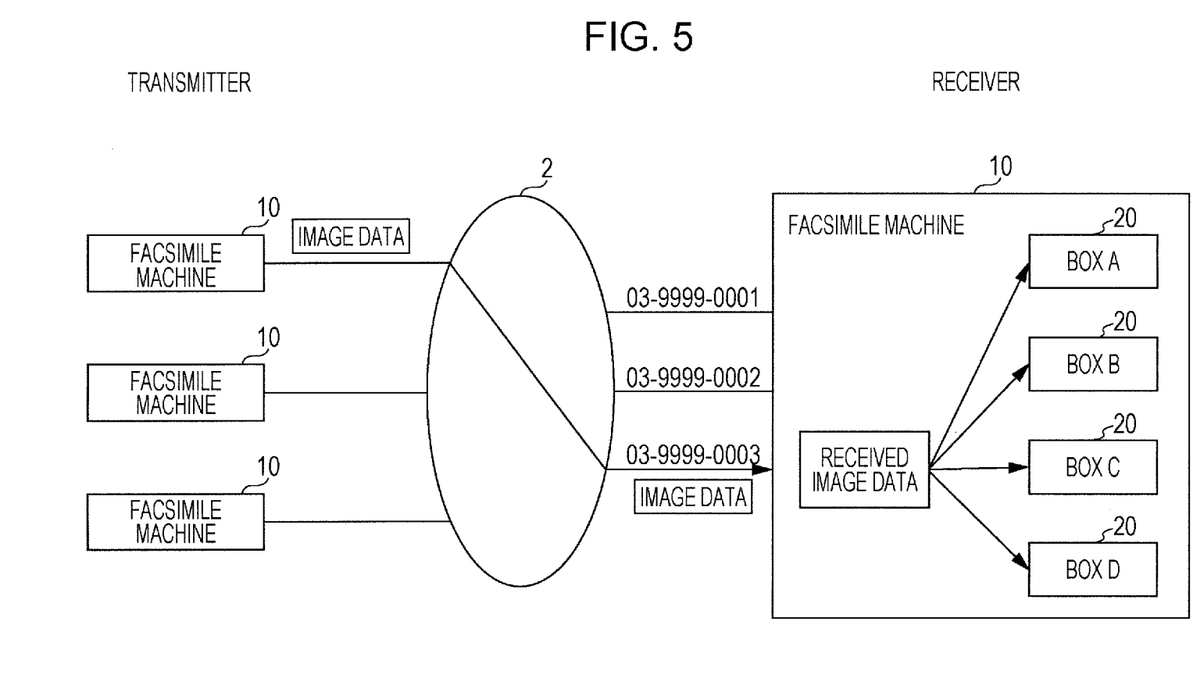
FIG. 5 is a diagram for illustrating another example of the method of sorting the received image data.

As still another method of sorting the received image data in accordance with the transmission source, a method of preparing and using plural numbers as the facsimile number (telephone number) of the receiving facsimile machine 10 is conceivable. FIG. 5 is a diagram for illustrating the method.

According to the above-described method, the user of the facsimile machine 10 uses a direct dial service, for example, to prepare plural numbers as the facsimile number of the facsimile machine 10. Then, the user of the facsimile machine 10 changes the facsimile number to be notified to another user (i.e., the user of another facsimile machine 10) depending on the user. In this case, the receiving facsimile machine 10 determines the storage destination of the received image data on the basis of the facsimile number called by the transmitting facsimile machine 10. That is, one of the boxes 20 according to the facsimile number called by the transmitting facsimile machine 10 is determined as the storage destination of the received image data, and the received image data is stored in the box 20. It is possible to realize the sorting function according to the transmission source in this manner.

In this case, however, the user of the receiving facsimile machine 10 needs to previously prepare plural numbers as the facsimile number of the receiving facsimile machine 10 by using the direct dial service or the like.

In this regard, the facsimile machine 10 according to the present exemplary embodiment is capable of sorting the received image data in accordance with the transmission source without previously preparing plural numbers as the facsimile number of the receiving facsimile machine 10.

Figure 6:
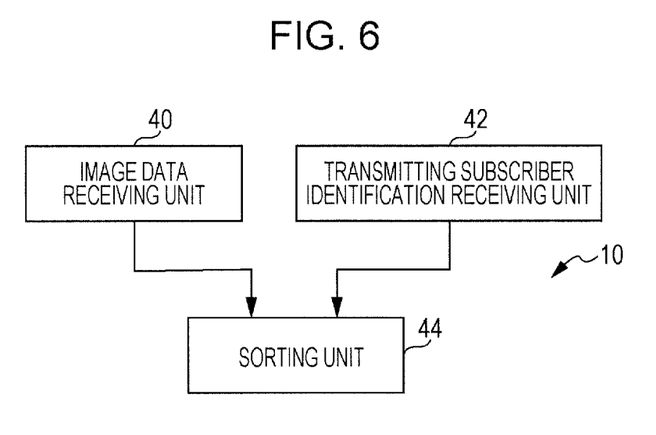
FIG. 6 is a functional block diagram of the facsimile machine.

A configuration for realizing the above-described sorting function will be described below. FIG. 6 is a functional block diagram illustrating functional blocks relating to the above-described sorting function among functional blocks realized by the facsimile machine 10.

As illustrated in FIG. 6, the facsimile machine 10 includes an image data receiving unit 40, a transmitting subscriber identification receiving unit 42, and a sorting unit 44. These functional blocks are realized by the controller 11. That is, the controller 11 executes processing in accordance with a program, thereby functioning as these functional blocks.

The image data receiving unit 40 receives and acquires image data transmitted from the transmitting facsimile machine 10 in conformity to the international standard for facsimile communication. The transmitting subscriber identification receiving unit 42 receives and acquires from the transmitting facsimile machine 10 the transmitting subscriber identification specified as an arbitrary signal in the G3 standard.

For example, the G3 standard specifies that the transmitting subscriber identification (TSI) is allowed to be transmitted as an arbitrary signal from a transmitting facsimile machine to a receiving facsimile machine in facsimile communication. When transmission and reception of image data is performed in conformity to the G3 standard, therefore, the transmitting subscriber identification receiving unit 42 receives and acquires the transmitting subscriber identification (TSI) transmitted from the transmitting facsimile machine 10.

On the basis of the transmitting subscriber identification received by the transmitting subscriber identification receiving unit 42 and a previously determined sorting condition, the sorting unit 44 sorts the image data received by the image data receiving unit 40 into at least one of the plural storage destinations.

As described above, the object as the storage destination of the received image data is not limited to what is called "box." For example, the object as the storage destination of the received image data may be what is called "folder" or "directory."

For instance, in the example illustrated in FIG. 2, the sorting unit 44 determines one of the boxes 20 as the storage destination of the received image data on the basis of the transmitting subscriber identification (TSI) received by the transmitting subscriber identification receiving unit 42.

The memory 12 stores data for determining the storage destination (sorting destination) of the received image data on the basis of the transmitting subscriber identification (TSI) (hereinafter described as "sorting rule data"). The sorting unit 44 determines the storage destination of the received image data on the basis of the sorting rule data.

Figure 7:
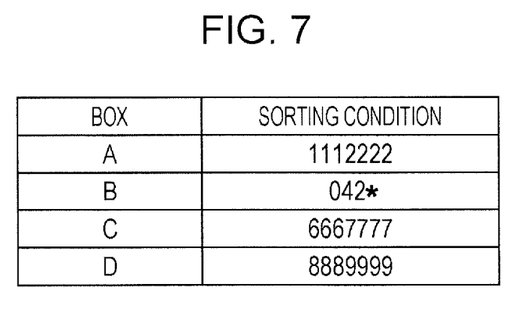
FIG. 7 is a diagram illustrating an example of sorting rule data.

FIG. 7 illustrates an example of the sorting rule data. The sorting rule data illustrated in FIG. 7 includes "box" and "sorting condition" fields. Each of the boxes 20 is set with a sorting condition. The sorting conditions for the respective boxes 20 are set by the user of the facsimile machine 10.

Each of the "box" fields represents the identification information of the box. Each of the "sorting condition" fields represents the condition to be satisfied by the transmitting subscriber identification (TSI) to determine the corresponding box as the storage destination of the received image data.

For example, if the transmitting subscriber identification (TSI) received by the transmitting subscriber identification receiving unit 42 satisfies the sorting condition related to box A, box A is determined as the storage destination of the received image data.

In the sorting rule data illustrated in FIG. 7, a numerical string as the above-described sorting condition (hereinafter referred to as "reference numerical string") is set. In FIG. 7, the asterisk "*" represents a wild card corresponding to one or plural arbitrary numbers. That is, in the sorting rule data illustrated in FIG. 7, not only a numerical string represented only by numbers but also a numerical string represented by numbers and the wild card "*" is set as the reference numerical string. The wild card "*" is limited not to be set at the head of the reference numerical string.

Figure 8:
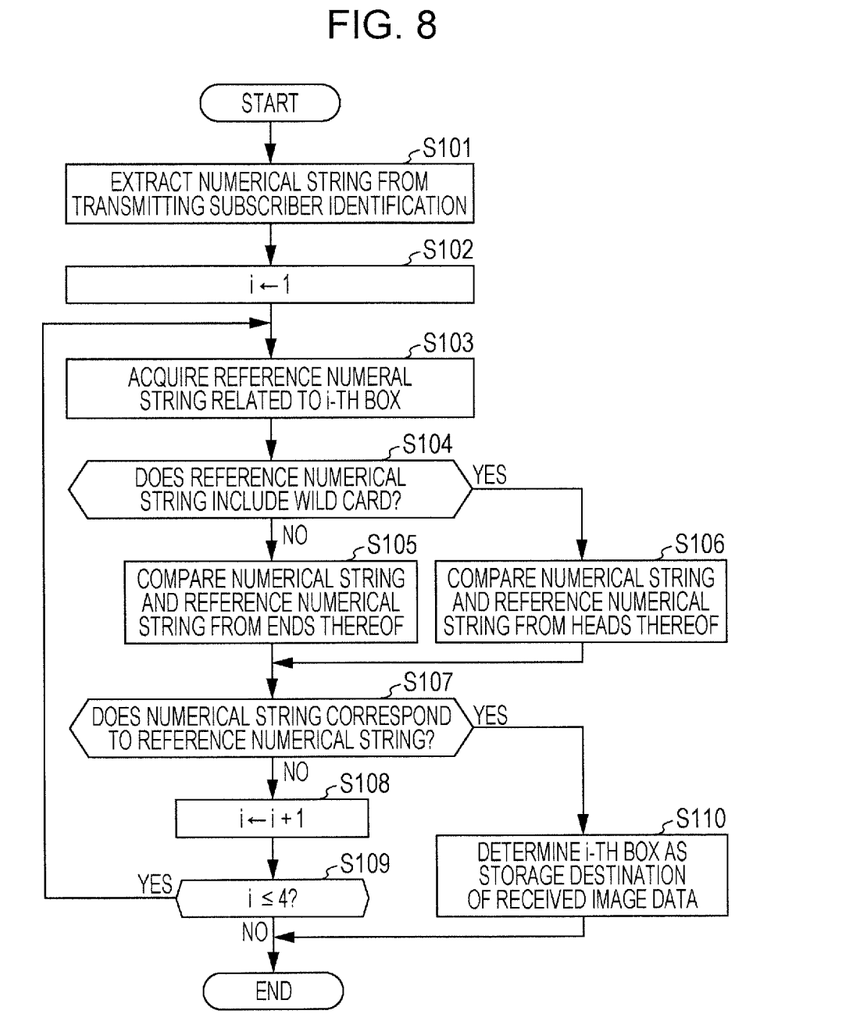
FIG. 8 is a flowchart illustrating an example of a process of determining a storage destination.

Description will be given below of a process of determining the storage destination of the received image data on the basis of the above-described sorting rule data. FIG. 8 is a flowchart illustrating an example of the process.

As illustrated in FIG. 8, the sorting unit 44 (an extracting unit) first removes characters other than numbers from the transmitting subscriber identification (TSI) received by the transmitting subscriber identification receiving unit 42, to thereby extract a numerical string (step S101).

If "space" is included in the transmitting subscriber identification (TSI), as in transmitting subscriber identification (TSI) "045 111 2222," for example, a numerical string "0451112222" is extracted at step S101 with the "space" removed from the transmitting subscriber identification (TSI).

Further, if symbols "+" and "−" and the "space" are included in the transmitting subscriber identification (TSI), as in transmitting subscriber identification (TSI) "+81 45-111-2222," for example, a numerical string "81451112222" is extracted at step S101 with the symbols "+" and "−" and the "space" removed from the transmitting subscriber identification (TSI).

After the execution of step S101, the sorting unit 44 initializes the value of a variable i to "1" (step S102). Then, the sorting unit 44 (a determining unit) determines whether or not the transmitting subscriber identification (TSI) satisfies the sorting condition related to the i-th box 20 (steps S103 to S107).

Specifically, the sorting unit 44 acquires the reference numerical string related to the i-th box 20 from the sorting rule data (step S103). Then, the sorting unit 44 determines whether or not the reference numerical string acquired at step S103 includes the wild card "*" (step S104).

If the reference numerical string does not include the wild card "*," the sorting unit 44 compares the numerical string acquired at step S101 and the reference numerical string acquired at step S103 sequentially from the ends of the numerical strings to determine whether or not the numerical string corresponds to the reference numerical string (step S105).

If the number of charterers included in the reference numerical string is "N," for example, the sorting unit 44 determines whether or not the N number of characters from the end of the numerical string acquired at step S101 (i.e., characters from the number at the end to the N-th number from the end) match the reference numerical string. Then, if these charterers match the reference numerical string, the sorting unit 44 determines that the numerical string corresponds to the reference numerical string.

Figure 9:
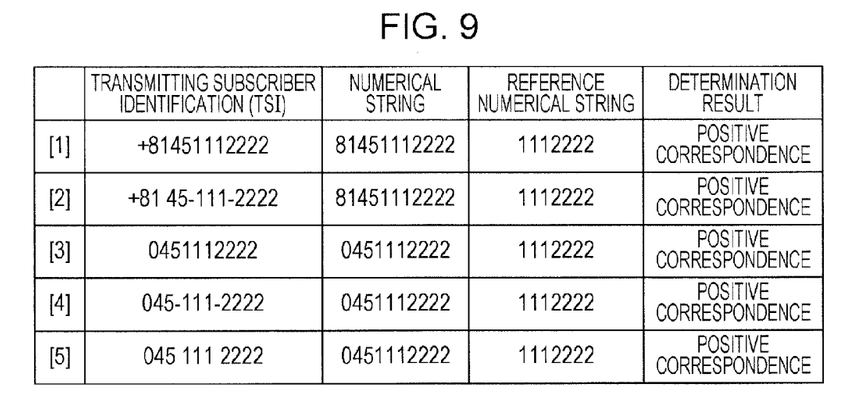
FIG. 9 is a diagram illustrating examples of determination result.

FIG. 9 illustrates examples of the determination result at step S105. All of examples 1 to 5 illustrated in FIG. 9 present a case in which the reference numerical string acquired at step S103 is "1112222." Herein, "1112222" corresponds to a numerical string obtained by removing the country code and the area code from the facsimile number.

Example 1 illustrated in FIG. 9 is a case in which the transmitting subscriber identification (TSI) received by the transmitting subscriber identification receiving unit 42 is "+81451112222." In this case, a numerical string "81451112222" is acquired at step S101. Further, in this case, the value of "N" is "7," and seven characters "1112222" from the end of the numerical string acquired at step S101 match the reference numerical string "1112222." Therefore, the sorting unit 44 determines that the numerical string corresponds to the reference numerical string.

Example 2 illustrated in FIG. 9 is a case in which the transmitting subscriber identification (TSI) received by the transmitting subscriber identification receiving unit 42 is "+81 45-111-2222." In this case, the numerical string "81451112222" is acquired at step S101 similarly as in example 1. Therefore, the sorting unit 44 determines that the numerical string corresponds to the reference numerical string similarly as in example 1.

Example 3 illustrated in FIG. 9 is a case in which the transmitting subscriber identification (TSI) received by the transmitting subscriber identification receiving unit 42 is "0451112222." In this case, a numerical string "0451112222" is acquired at step S101. Further, in this case, the value of "N" is "7," and seven characters "1112222" from the end of the numerical string acquired at step S101 match the reference numerical string "1112222." Therefore, the sorting unit 44 determines that the numerical string corresponds to the reference numerical string.

Example 4 illustrated in FIG. 9 is a case in which the transmitting subscriber identification (TSI) received by the transmitting subscriber identification receiving unit 42 is "045-111-2222." In this case, the numerical string "0451112222" is acquired at step S101 similarly as in example 3. Therefore, the sorting unit 44 determines that the numerical string corresponds to the reference numerical string similarly as in example 3.

Example 5 illustrated in FIG. 9 is a case in which the transmitting subscriber identification (TSI) received by the transmitting subscriber identification receiving unit 42 is "045 111 2222." In this case, the numerical string "0451112222" is acquired at step S101 similarly as in example 3. Therefore, the sorting unit 44 determines that the numerical string corresponds to the reference numerical string similarly as in example 3.

Meanwhile, if it is determined at step S104 that the reference numerical string includes the wild card "*," the sorting unit 44 compares the numerical string acquired at step S101 and the reference numerical string acquired at step S103 sequentially from the heads of the numerical strings to determine whether or not the numerical string corresponds to the reference numerical string (step S106).

If the number of charterers in the reference numerical string acquired at step S103 from the number at the head of the reference numeral string to the number preceding the wild card "*" is "M," for example, the sorting unit 44 determines whether or not the numerical string acquired at step S101 and the reference numerical string match in the M number of characters from the head (i.e., characters from the number at the head to the M-th number from the head). Then, if these characters match, the sorting unit 44 determines that the numerical string corresponds to the reference numerical string.

Figure 10:
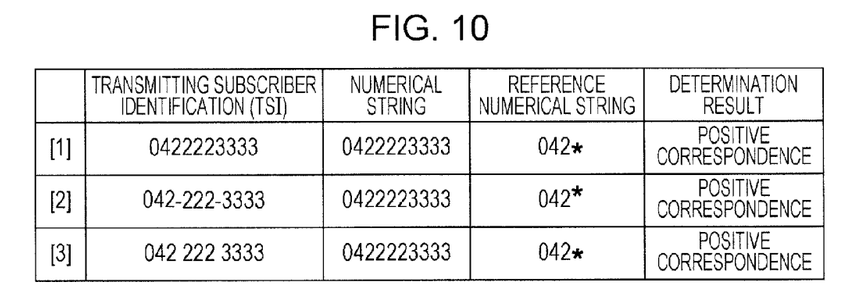
FIG. 10 is a diagram illustrating other examples of the determination result.

FIG. 10 illustrates examples of the determination result at step S106. All of examples 1 to 3 illustrated in FIG. 10 present a case in which the reference numerical string acquired at step S103 is "042*."

Example 1 illustrated in FIG. 10 is a case in which the transmitting subscriber identification (TSI) received by the transmitting subscriber identification receiving unit 42 is "0422223333." In this case, a numerical string "0422223333" is acquired at step S101. Further, in this case, the value of "M" is "3," and three characters "042" from the head of the numerical string acquired at step S101 match three characters "042" from the head of the reference numerical string. Therefore, the sorting unit 44 determines that the numerical string corresponds to the reference numerical string.

Example 2 illustrated in FIG. 10 is a case in which the transmitting subscriber identification (TSI) received by the transmitting subscriber identification receiving unit 42 is "042-222-3333." In this case, the numerical string "0422223333" is acquired at step S101 similarly as in example 1. Therefore, the sorting unit 44 determines that the numerical string corresponds to the reference numerical string similarly as in example 1.

Example 3 illustrated in FIG. 10 is a case in which the transmitting subscriber identification (TSI) received by the transmitting subscriber identification receiving unit 42 is "042 222 3333." In this case, the numerical string "0422223333" is acquired at step S101 similarly as in example 1. Therefore, the sorting unit 44 determines that the numerical string corresponds to the reference numerical string similarly as in example 1.

After the execution of step S105 or step S106, the sorting unit 44 determines whether or not the result of comparison at step S105 or step S106 is a predetermined result. Herein, the "predetermined result" is that the numerical string corresponds to the reference numerical string. Therefore, the sorting unit 44 determines whether or not the numerical string acquired at step S101 has been determined to correspond to the reference numerical string acquired at step S103 (step S107).

If it is determined that the numerical string corresponds to the reference numerical string, the sorting unit 44 (the determining unit) determines the i-th box 20 as the storage destination of the received image data (step S110). In this case, the present process is completed, and the received image data is stored in the i-th box 20.

Meanwhile, if it is determined that the numerical string does not correspond to the reference numerical string, the sorting unit 44 adds 1 to the variable i (step S108), and determines whether or not the value of the variable i is equal to or smaller than 4 (step S109). Herein, "4" is the total number of the boxes 20.

If the value of the variable i is equal to or smaller than 4, the sorting unit 44 re-executes the process of step S103. Meanwhile, a case in which the value of the variable i is neither equal to nor smaller than 4 corresponds to a case in which the transmitting subscriber identification (TSI) has failed to satisfy any of the sorting conditions of the boxes 20, i.e., a case in which none of the boxes 20 has been determined as the storage destination of the received image data. In this case, the present process is completed, and the received image data is stored in a normal in-box.

The above-described facsimile machine 10 includes the sorting unit 44, and thereby is capable of sorting the received image data into one of the boxes 20 in accordance with the transmission source by using the transmitting subscriber identification specified as an arbitrary signal by the international standard (G3 standard) for facsimile communication. That is, the facsimile machine 10 realizes the sorting of the received image data into one of the boxes 20 according to the transmission source by using a function specified in the international standard (G3 standard) for facsimile communication.

For example, as the method of sorting the received image data into one of the boxes 20 in accordance with the transmission source, a method using the caller number notification service is conceivable (FIG. 4). The specifications of the caller number notification service, however, vary depending on the country (the communication service provider). To realize the sorting function using the caller number notification service in each country, therefore, it is necessary to realize the sorting function in accordance with the specifications of the caller number notification service in the country. In this regard, the facsimile machine 10 according to the present exemplary embodiment realizes the sorting of the received image data into one of the boxes 20 according to the transmission source without using the caller number notification service.

Further, for example, as the method of sorting the received image data into one of the boxes 20 in accordance with the transmission source, a method of preparing and using plural numbers as the facsimile number of the receiving facsimile machine 10 is conceivable (FIG. 5). In this case, however, it is necessary to prepare plural numbers as the facsimile number of the facsimile machine 10. In this regard, the facsimile machine 10 according to the present exemplary embodiment realizes the sorting of the received image data into one of the boxes 20 according to the transmission source without preparing plural numbers as the facsimile number of the receiving facsimile machine 10.

The above-described transmitting subscriber identification (TSI) is set by the user of the transmitting facsimile machine 10, and thus may be set in various forms. For example, the transmitting subscriber identification (TSI) as illustrated in examples 2 to 5 in FIG. 9, for example, may be set.

That is, for example, a case is conceivable in which transmitting subscriber identification (TSI) including a character other than numbers, such as the symbol "−" or the "space," is set, as illustrated in examples 2, 4, and 5 in FIG. 9. In this regard, the facsimile machine 10 executes step S101 in FIG. 8, to thereby execute the sorting of the received image data only on the basis of the numbers included in the transmitting subscriber identification (TSI). That is, the sorting of the received image data is executed even if the transmitting subscriber identification (TSI) includes a character other than numbers, such as the symbol "−" or the "space."

Further, for example, a case in which transmitting subscriber identification (TSI) including the country code is set, as illustrated in examples 1 and 2 in FIG. 9, for example, and a case in which transmitting subscriber identification (TSI) not including the country code is set, as illustrated in examples 3 to 5 in FIG. 9, are both conceivable. That is, it is conceivable that a head portion of the transmitting subscriber identification (TSI) varies depending on the settings made by the user. In this regard, the facsimile machine 10 executes step S105 in FIG. 8 (i.e., the comparison from the ends of the numerical sequences), to thereby sort the received image data in accordance with the transmission source in both of the above-described cases.

The present invention is not limited to the exemplary embodiment described above.

1. For example, on the basis of respective priorities set for plural types of sorting conditions, the sorting unit 44 (the determining unit) may sequentially select the plural sorting conditions, and determine the storage destination (the sorting destination) of the received image data on the basis of the selected sorting conditions.

That is, if the sorting unit 44 (the determining unit) fails to determine the storage destination of the received image data on the basis of a selected sorting condition, the sorting unit 44 may newly select another sorting condition of the second highest priority next to the selected sorting condition, and determine the storage destination of the received image data on the basis of the newly selected sorting condition.

For example, the above-described "plural types of sorting conditions" include plural sorting conditions selected from a sorting condition relating to the transmitting subscriber identification (TSI), a sorting condition relating to the transmitting facsimile number, and a sorting condition relating to the receiving facsimile number. The following description will be given of a case in which three types of sorting conditions, i.e., the sorting condition relating to the transmitting subscriber identification (TSI), the sorting condition relating to the transmitting facsimile number, and the sorting condition relating to the receiving facsimile number, correspond to the above-described "plural types of sorting conditions."

In this case, the sorting function using the transmitting subscriber identification (TSI) (FIG. 2), the sorting function using the transmitting facsimile number (FIG. 4), and the sorting function using the receiving facsimile number (FIG. 5) are combined, as described below.

In this modified example, the priorities of the respective sorting conditions usable for determining the storage destination (i.e., the priorities of the respective sorting functions) are set. The priorities may be preset by a developer of the facsimile machine 10, or may be arbitrarily set by the user. The following description will be given of the case in which the above-described priorities are arbitrarily set by the user.

Figure 11:
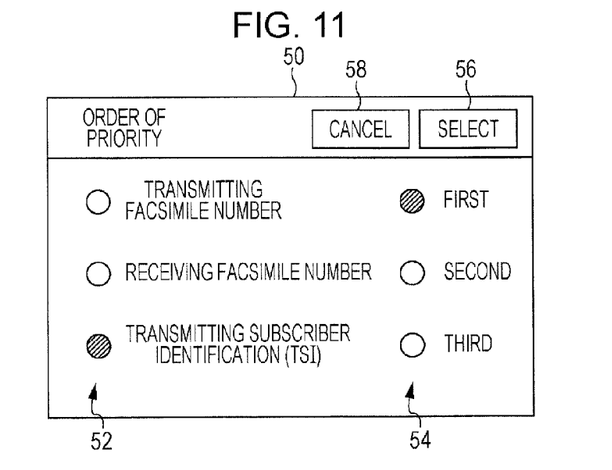
FIG. 11 is a diagram illustrating an example of a priority setting screen.

If the user performs a predetermined operation on the facsimile machine 10, a propriety setting screen for setting the above-described priorities is displayed on the display 14.

FIG. 11 illustrates an example of the propriety setting screen. A propriety setting screen 50 illustrated in FIG. 11 displays a specification field 52 for specifying the target for which the priority is to be set and a specification field 54 for specifying the priority.

For example, if the user wants to set "first" as the priority of the sorting condition relating to the transmitting subscriber identification (TSI), the user first selects "transmitting subscriber identification (TSI)" in the specification filed 52. Thereafter, the user sets "first" in the specification field 54.

Further, if the user wants to set "second" as the priority of the sorting condition relating to the transmitting facsimile number, the user first selects "transmitting facsimile number" in the specification filed 52. Thereafter, the user sets "second" in the specification field 54.

Further, if the user wants to set "third" as the priority of the sorting condition relating to the receiving facsimile number, the user first selects "receiving facsimile number" in the specification filed 52. Thereafter, the user sets "third" in the specification field 54.

If the user wants to cancel the setting of the priorities, the user presses a cancel button 58. After the setting of the priorities is completed, the user presses a select button 56. If the select button 56 is pressed, data representing the result of setting performed on the priority setting screen 50 (hereinafter described as "priority data") is stored in the memory 12.

Figure 12:
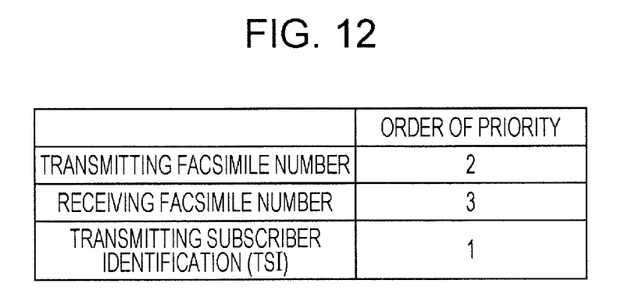
FIG. 12 is a diagram illustrating an example of priority data.

FIG. 12 illustrates an example of the priority data. As illustrated in FIG. 12, the priority data represents the priorities of the respective sorting conditions for determining the storage destination.

In the priority data illustrated in FIG. 12, the sorting condition relating to the transmitting subscriber identification (TSI) is set to the "first" priority. Further, the sorting condition relating to the transmitting facsimile number is set to the "second" priority, and the sorting condition relating to the receiving facsimile number is set to the "third" priority.

In this case, the storage destination of the received image data is first determined on the basis of the sorting condition relating to the transmitting subscriber identification (TSI) (FIG. 2). Then, if the storage destination of the received image data fails to be determined on the basis of the sorting condition relating to the transmitting subscriber identification (TSI), the storage destination of the received image data is determined on the basis of the sorting condition relating to the transmitting facsimile number (FIG. 4). Further, if the storage destination of the received image data fails to be determined on the basis of the sorting condition relating to the transmitting facsimile number, the storage destination of the received image data is determined on the basis of the sorting condition relating to the receiving facsimile number (FIG. 5).

In this modified example, the sorting rule data representing the above-described sorting conditions used to determine the storage destination of the received image data is set.

Figure 13:
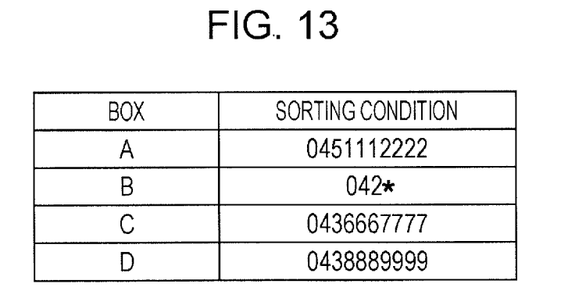
FIG. 13 is a diagram illustrating another example of the sorting rule data.

FIG. 13 illustrates an example of the sorting rule data representing the sorting condition relating to the transmitting facsimile number (i.e., the sorting rule data for determining the storage destination of the received image data on the basis of the transmitting facsimile number). In the sorting rule data illustrated in FIG. 13, each of the sorting conditions related to the boxes 20 represents the condition to be satisfied by the transmitting facsimile number to determine the corresponding box 20 as the storage destination of the received image data. The sorting conditions for the boxes 20 are set by the user of the facsimile machine 10.

Figure 14:
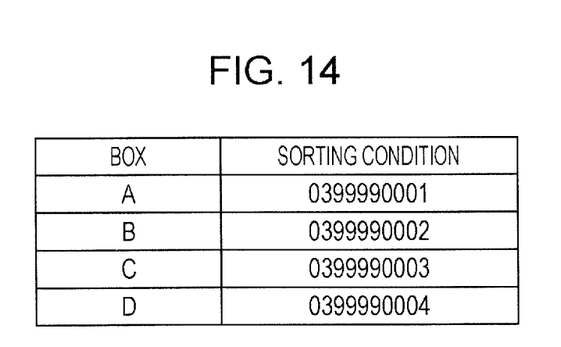
FIG. 14 is a diagram illustrating another example of the sorting rule data.

FIG. 14 illustrates an example of the sorting rule data representing the sorting condition relating to the receiving facsimile number (i.e., the sorting rule data for determining the storage destination of the received image data on the basis of the receiving facsimile number). In the sorting rule data illustrated in FIG. 14, each of the sorting conditions related to the boxes 20 represents the condition to be satisfied by the receiving facsimile number to determine the corresponding box 20 as the storage destination of the received image data. The sorting conditions for the boxes 20 are set by the user of the facsimile machine 10.

The sorting rule data representing the sorting condition relating to the transmitting subscriber identification (TSI) (i.e., the sorting rule data for determining the storage destination of the received image data on the basis of the transmitting subscriber identification (TSI)) is similar to the data illustrated in FIG. 7.

Figure 15:
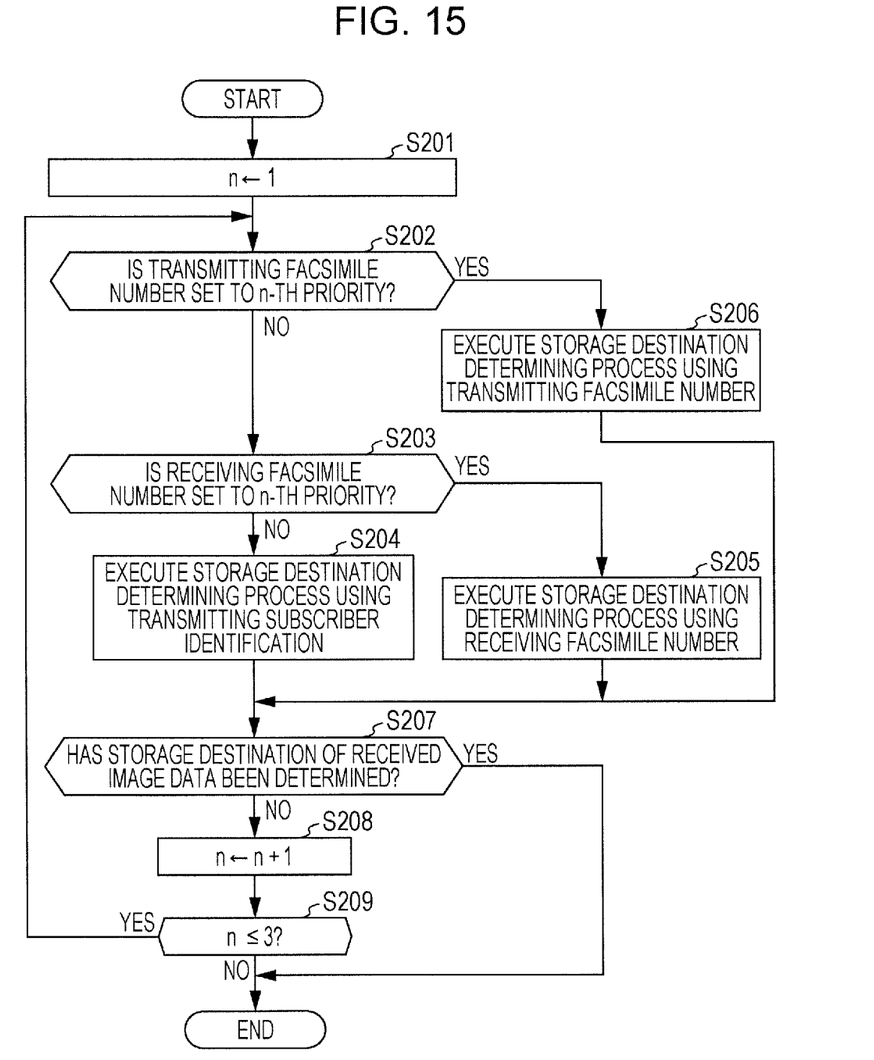
FIG. 15 is a flowchart illustrating another example of the process of determining the storage destination.

FIG. 15 is a flowchart illustrating an example of the process for determining the stage destination of the received image data. As illustrated in FIG. 15, the sorting unit 44 (the determining unit) first initializes the value of a variable n to "1" (step S201). Then, the sorting unit 44 (the determining unit) determines whether or not the transmitting facsimile number is set to the "n-th" priority (step S202).

If the transmitting facsimile number is not set to the "n-th" priority, the sorting unit 44 (the determining unit) determines whether or not the receiving facsimile number is set to the "n-th" priority (step S203).

A case in which the receiving facsimile number is not set to the "n-th" priority corresponds to a case in which the transmitting subscriber identification (TSI) is set to the "n-th" priority. In this case, the sorting unit 44 (the determining unit) executes a process of determining the storage destination with the use of the sorting condition relating to the transmitting subscriber identification (TSI) (step S204). The process executed at step S204 is similar to the process illustrated in FIG. 8.

Figure 16:
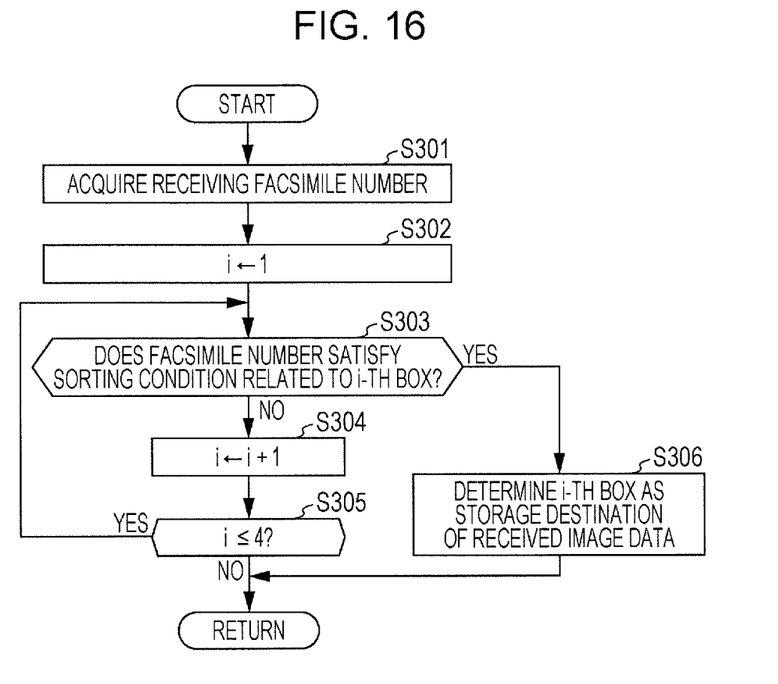
FIG. 16 is a flowchart illustrating an example of a process of determining the storage destination by using a sorting condition relating to a receiving facsimile number.

Meanwhile, if it is determined at step S203 that the receiving facsimile number is set to the "n-th" priority, the sorting unit 44 (the determining unit) executes a process of determining the storage destination with the use of the sorting condition relating to the receiving facsimile number (step S205). FIG. 16 is a flowchart illustrating an example of the process executed at step S205.

As illustrated in FIG. 16, the sorting unit 44 first acquires the receiving facsimile number (step S301). That is, the sorting unit 44 acquires the facsimile number used to receive the image data (i.e., the facsimile number called by the transmitting facsimile machine 10).

Thereafter, the sorting unit 44 initializes the value of the variable i to "1" (step S302). Then, the sorting unit 44 refers to the sorting rule data representing the sorting condition relating to the receiving facsimile number (FIG. 14), and determines whether or not the facsimile number acquired at step S301 satisfies the sorting condition related to the i-th box 20 (step S303).

If the facsimile number satisfies the sorting condition, the sorting unit 44 determines the i-th box 20 as the storage destination of the received image data (step S306), and the present process is completed.

Meanwhile, if the facsimile number does not satisfy the sorting condition, the sorting unit 44 adds 1 to the variable i (step S304), and determines whether or not the value of the variable i is equal to or smaller than 4 (step S305). Herein, "4" is the total number of the boxes 20. If the value of the variable i is equal to or smaller than 4, the sorting unit 44 re-executes the process of step S303.

Meanwhile, a case in which the value of the variable i is neither equal to nor smaller than 4 corresponds to a case in which the facsimile number acquired at step S301 has failed to satisfy any of the sorting conditions related to the boxes 20. In this case, the present process is completed with none of the boxes 20 determined as the storage destination of the received image data.

If it is determined at step S202 in FIG. 15 that the transmitting facsimile number is set to the "n-th" priority, the sorting unit 44 executes a process of determining the storage destination with the use of the sorting condition relating to the transmitting facsimile number (step S206).

The process executed at step S206 is similar to the process illustrated in FIG. 16. In this case, however, the sorting unit 44 acquires the transmitting facsimile number at step S301 in FIG. 16. That is, the sorting unit 44 acquires the facsimile number of the transmitting facsimile machine 10.

Further, at step S303 in FIG. 16, the sorting unit 44 refers to the sorting rule data representing the sorting condition relating to the transmitting facsimile number (FIG. 13), and determines whether or not the facsimile number acquired at step S301 satisfies the sorting condition related to the i-th box 20.

After the execution of one of steps S204 to S206 in FIG. 15, the sorting unit 44 determines whether or not any of the boxes 20 has been determined as the storage destination of the received image data (step S207).

If any of the boxes 20 has been determined as the storage destination of the received image data, the present process is completed, and the received image data is stored in the box 20 determined as the storage destination.

Meanwhile, if none of the boxes 20 has been determined as the storage destination of the received image data, the sorting unit 44 adds 1 to the value of the variable n (step S208), and determines whether or not the value of the variable n is equal to or smaller than 3 (step S209). Herein, "3" is the total number of the types of sorting conditions (i.e., the total number of information items usable for sorting the received image data).

If the value of the variable n is equal to or smaller than 3, the sorting unit 44 re-executes the process of step S202. A case in which the value of the variable n is neither equal to nor smaller than 3 corresponds to a case in which none of the boxes 20 has been determined as the storage destination of the received image data even after execution of the process of determining the storage destination by using all of the sorting conditions. In this case, the present process is completed, and the received image data is stored in a normal in-box.

According to the above-described configuration, even if the storage destination of the received image data fails to be determined on the basis of certain information (the transmitting subscriber identification (TSI), for example), the storage destination of the received image data may be determined on the basis of other information (the transmitting facsimile number or the receiving facsimile number, for example). With the above-described configuration, the possibility that the storage destination of the received image data be determined is increased.

2. Although the above-described exemplary embodiment allows the setting of the reference numerical string including the wild card "*," the reference numerical string including the wild card "*" may be disallowed. In this case, steps S104 and S106 in FIG. 8 may be omitted.

Further, although one of the boxes 20 is determined as the storage destination of the received image data in the above-described exemplary embodiment, plural ones of the boxes 20 may be determined as the storage destination of the received image data.

Further, the data stored in the memory 12 in the above description may be stored in a memory included in another apparatus accessible from the facsimile machine 10. For example, the received image data, which is stored in the memory 12 included in the facsimile machine 10 in the above-described exemplary embodiment, may be stored in a memory included in another apparatus accessible from the facsimile machine 10.

Further, the facsimile machine 10 may be realized by installing in a computer a program stored in an information storage medium, such as an optical disc or a memory card. Alternatively, the facsimile machine 10 may be realized by installing in a computer a program supplied via a network.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A facsimile machine comprising:
   at least one processor configured to execute:
   an image data receiving unit configured to receive image data transmitted from a transmitting facsimile machine;
   a transmitting subscriber identification receiving unit configured to receive transmitting subscriber identification specified as an arbitrary signal in a Group 3 standard and transmitted from the transmitting facsimile machine;
   a sorting unit configured to sort the image data received by the image data receiving unit into at least one of a plurality of storage destinations on the basis of the transmitting subscriber identification received by the transmitting subscriber identification receiving unit and predetermined sorting conditions;
   an extracting unit configured to extract a numerical string by extracting numbers included in the transmitting subscriber identification; and
   a determining unit configured to, in response to the numerical string satisfying one of the sorting conditions related to the at least one of the storage destinations, determine to store the image data in the at least one of the storage destinations,
   wherein the determining unit is configured to compare a numerical string related to the at least one of the storage destinations and the numerical string extracted by the extracting unit from heads of the numerical strings in response to the numerical string related to the at least one of the storage destinations including a wild card,
   wherein the determining unit is configured to, in response to the numerical string related to the at least one of the storage destinations and the numerical string extracted by the extracting unit matching, determine to store the image data in the at least one of the storage destinations, and
   wherein the determining unit is configured to sequentially select the sorting conditions of the image data on the basis of respective priorities set for the sorting conditions, and determine the at least one of the storage destinations of the image data on the basis of the selected sorting conditions.

2. A non-transitory computer readable medium storing a program causing a computer to execute a process for facsimile communication, the process comprising:
   receiving image data transmitted from a transmitting facsimile machine;
   receiving transmitting subscriber identification specified as an arbitrary signal in a Group 3 standard and transmitted from the transmitting facsimile machine;
   sorting the received image data into at least one of a plurality of storage destinations on the basis of the received transmitting subscriber identification and predetermined sorting conditions;
   extracting a numerical string by extracting numbers included in the transmitting subscriber identification;
   in response to the numerical string satisfying one of the sorting conditions related to the at least one of the storage destinations, determining to store the image data in the at least one of the storage destinations;
   comparing a numerical string related to the at least one of the storage destinations and the numerical string extracted by the extracting from heads of the numerical strings in response to the numerical string related to the at least one of the storage destinations including a wild card;
   in response to the numerical string related to the at least one of the storage destinations and the numerical string extracted by the extracting matching, determining to store the image data in the at least one of the storage destinations;
   sequentially selecting the sorting conditions of the image data on the basis of respective priorities set for the sorting conditions; and
   determining the at least one of the storage destinations of the image data on the basis of the selected sorting conditions.

3. A facsimile communication method comprising:
   receiving image data transmitted from a transmitting facsimile machine;

receiving transmitting subscriber identification specified as an arbitrary signal in a Group 3 standard and transmitted from the transmitting facsimile machine;

sorting the received image data into at least one of a plurality of storage destinations on the basis of the received transmitting subscriber identification and predetermined sorting conditions;

extracting a numerical string by extracting numbers included in the transmitting subscriber identification;

in response to the numerical string satisfying one of the sorting conditions related to the at least one of the storage destinations, determining to store the image data in the at least one of the storage destinations;

comparing a numerical string related to the at least one of the storage destinations and the numerical string extracted by the extracting from heads of the numerical strings in response to the numerical string related to the at least one of the storage destinations including a wild card;

in response to the numerical string related to the at least one of the storage destinations and the numerical string extracted by the extracting matching, determining to store the image data in the at least one of the storage destinations;

sequentially selecting the sorting conditions of the image data on the basis of respective priorities set for the sorting conditions; and determining the at least one of the storage destinations of the image data on the basis of the selected sorting conditions.

* * * * *